(12) United States Patent
Song et al.

(10) Patent No.: US 11,817,584 B2
(45) Date of Patent: Nov. 14, 2023

(54) BINDER FOR THE LITHIUM SECONDARY BATTERY, ELECTRODE COMPRISING SAME AND LITHIUM SECONDARY BATTERY

(71) Applicant: IPI TECH INC., Daejeon (KR)

(72) Inventors: Seung Wan Song, Sejong-Si (KR); Hieu Quang Pham, Daejeon (KR); Hyun Min Jung, Daejeon (KR)

(73) Assignee: IPI TECH INC., Daejeon (KR)

( * ) Notice: Subject to any disclaimer, the term of this patent is extended or adjusted under 35 U.S.C. 154(b) by 771 days.

(21) Appl. No.: 16/964,313

(22) PCT Filed: Jan. 21, 2019

(86) PCT No.: PCT/KR2019/000807
§ 371 (c)(1),
(2) Date: Jul. 23, 2020

(87) PCT Pub. No.: WO2019/146968
PCT Pub. Date: Aug. 1, 2019

(65) Prior Publication Data
US 2021/0043935 A1    Feb. 11, 2021

(30) Foreign Application Priority Data
Jan. 23, 2018  (KR) .................. 10-2018-0008017

(51) Int. Cl.
*H01M 4/62* (2006.01)
*C08K 3/11* (2018.01)
(Continued)

(52) U.S. Cl.
CPC ........ *H01M 4/622* (2013.01); *C08G 73/1067* (2013.01); *C08K 3/04* (2013.01); *C08K 3/11* (2018.01); *C08K 3/22* (2013.01); *H01M 4/505* (2013.01); *H01M 4/525* (2013.01); *H01M 10/0525* (2013.01); *C08K 2003/2203* (2013.01); *C08K 2003/2262* (2013.01); *C08K 2003/2289* (2013.01); *C08K 2003/2293* (2013.01);
(Continued)

(58) Field of Classification Search
CPC ...... H01M 4/622; H01M 4/505; H01M 4/525; C08G 73/1067; C08K 3/11; C08K 3/04; C08K 3/22
See application file for complete search history.

(56) References Cited

FOREIGN PATENT DOCUMENTS

| JP | 2008-34352 A | 2/2008 |
|---|---|---|
| JP | 5259373 B2 | 8/2013 |

(Continued)

OTHER PUBLICATIONS

International Search Report dated May 8, 2019, in connection with corresponding International Patent Application No. PCT/KR2018/000807.

(Continued)

*Primary Examiner* — Sarah A. Slifka
(74) *Attorney, Agent, or Firm* — Hauptman Ham, LLP (57) ABSTRACT

The present invention relates to a binder for a lithium secondary battery, an electrode comprising the same, and a lithium secondary battery comprising the electrode. More specifically, the present invention provides a binder for a lithium secondary battery having excellent cycle life and high energy density, an anode for a lithium secondary battery comprising the same, and a lithium secondary battery prepared therefrom.

11 Claims, 6 Drawing Sheets

(51) Int. Cl.
*C08G 73/10* (2006.01)
*C08K 3/04* (2006.01)
*C08K 3/22* (2006.01)
*H01M 4/505* (2010.01)
*H01M 4/525* (2010.01)
*H01M 10/0525* (2010.01)
*H01M 4/02* (2006.01)

(52) U.S. Cl.
CPC .. *C08K 2201/001* (2013.01); *C08K 2201/003* (2013.01); *H01M 2004/028* (2013.01)

(56) References Cited

FOREIGN PATENT DOCUMENTS

| KR | 10-1323269 B1 | 10/2013 |
| WO | 2016-125718 A1 | 8/2016 |

OTHER PUBLICATIONS

Ji Mok Lee et al., "Preparation of Aminosiloxane-grafted Poly(imidesiloxane) Copolymer and its Morphology and Adhesive Properties in Film", Polymer(Korea), 2013, vol. 37, No. 4, pp. 547-552, cited in NPL No. 1.

"Chungnam National University & Kumoh National Institute of Technology, Development of a binder material with high performance for a lithium secondary battery", The Electronic Times (http://www.etnews.com/20180117000309), Jan. 17, 2018, cited in NPL No. 1.

[Supportive Materials for Exception to Loss of Novelty] Quang Pham Hieu et al., "Fluorinated Polyimide as a Novel High-Voltage Binder for High-Capacity Cathode of Lithium-Ion Batteries", Advanced Functional Materials, 2017, 1704690. Wiley-VCH Verlag GmbH & Co. KGaA, Weinheim.

BINDER FOR THE LITHIUM SECONDARY BATTERY, ELECTRODE COMPRISING SAME AND LITHIUM SECONDARY BATTERY

CROSS-REFERENCE TO RELATED APPLICATION

The present application is a national stage filing under 35 U.S.C § 371 of PCT application number PCT/KR2019/000807 filed on Jan. 21, 2019 which is based upon and claims the benefit of priorities to Korean Patent Application No. 10-2018-0008017, filed on Jan. 23, 2018, in the Korean Intellectual Property Office, which are incorporated herein in their entireties by reference.

FIELD

The present disclosure relates to a binder for a lithium secondary battery, an electrode containing the binder, and a lithium secondary battery including the electrode.

DESCRIPTION OF RELATED ART

In recent years, spread of portable electronic devices such as smartphones and notebooks has increased. In this connection, trend of miniaturization and weight reduction of the electronic devices requires a battery having high energy and high density. Furthermore, as fields of applications of energy storage technology have been expanded from vehicle power sources for electric vehicles to energy storage systems, and as a size of the energy storage thereof becomes larger, it is necessary to increase energy density of secondary batteries to store a larger amount of electric energy. In particular, there is a need for a battery that may operate in a wide temperature range as well as may have the high energy density.

In general, a lithium ion secondary battery includes lithium-containing cobalt oxide ($LiCoO_2$) as a positive electrode, a carbon electrode as a negative electrode, and a non-aqueous electrolyte solution in which lithium ions are dissolved in an organic solvent such as propylene carbonate as an electrolyte. In addition, the lithium ion secondary battery further includes as a positive electrode active material such as lithium-containing manganese oxides such as $LiMnO_2$ having a layered crystal structure and $LiMn_2O_4$ having a spinel crystal structure, and lithium-containing nickel oxide ($LiNiO_2$).

Capacity and stability of the positive electrode active material is determined based on reversible intercalation and de-intercalation of lithium ions. Increasing a charging voltage increases de-intercalation of the lithium ions from the positive electrode active material to increase capacity thereof. However, when the de-intercalation of the lithium ions from the positive electrode active material increases, a crystal structure of the positive electrode active material may be destroyed or oxidative decomposition of a binder and the organic electrolyte may occur due to the increase in the charging voltage. This may degrade battery characteristics such as high rate discharge characteristics and cycle characteristics.

Many techniques have been proposed to improve the positive electrode active material or a negative electrode active material, the electrolyte, etc. to improve the battery characteristics. Techniques to improve the binder, especially, the binder for the positive electrode are limited.

An electrode of the lithium ion secondary battery is prepared by applying and drying an electrode composition containing an active material, a binder, and a conductive material onto a current collector. In an example, the positive electrode may be prepared by applying a slurry in which $LiCoO_2$ as the positive electrode active material, polyvinylidene difluoride (PVdF) as a binder, and carbon black as the conductive material are dispersed onto a current collector as an aluminum thin film and drying the applied slurry.

In this connection, PVdF is not soluble in water or may not be dispersed. Thus, an organic solvent is required. Further, PVdF is swollen due to the electrolyte in a high temperature and high voltage environment, thereby weakening a binding force thereof to the active material, and lowering durability of the battery, and increasing an electrode resistance. Further, when thermal runaway of the secondary battery occurs due to limitation in high temperature stability, PVdF is ignited to promote the thermal runaway and may cause fire and explosion.

On the other hand, the negative electrode may be prepared by applying a slurry in which graphite as an active material, sodium carboxymethylcellulose or styrene-butadiene rubber as an aqueous binder or PVdF, polyacrylic acid or polyvinyl alcohol as a non-aqueous binder, and carbon black as a conductive material are dispersed onto a copper foil current collector and drying the applied slurry.

Unlike the negative electrode, when the positive electrode contains the aqueous binder, the positive electrode may be susceptible to moisture and thus oxidative decomposition may occur therein during charging. Further, it is difficult to uniformly disperse the slurry for the positive electrode. Due to occurrence of cracks in the positive electrode, a reliable conductive path may not be sufficiently secured, so that high-rate discharge characteristics may decrease. Further, elution of lithium of the positive electrode active material may occur thereby to deteriorate the battery characteristics such as positive electrode capacity and cycle characteristics. This problem may be exacerbated under high temperature and high voltage charging conditions.

Accordingly, there is a need for research and development of a binder for a positive electrode for a lithium secondary battery which has stability and performance.

(Prior Art Document) Japanese Patent No. 5259373 (2013 May 2.)

DISCLOSURE

Technical Purposes

A purpose of the present disclosure is to provide a binder for a lithium secondary battery with excellent cycle life and high energy density, a positive electrode for a lithium secondary battery containing the binder, and a lithium secondary battery including the positive electrode.

Further, a purpose of the present disclosure is to provide a binder for a lithium secondary battery to improve durability due to excellent interfacial adhesion thereof to an active material, and allow formation of a stable surface protective layer on a surface of the active material, and to accept an volume expansion of the active material occurring during repeated charging and discharging, thereby to improve electrode structure stability and battery characteristics, and is to provide a positive electrode for a lithium secondary battery containing the binder, and a lithium secondary battery including the positive electrode.

Technical Solutions

In order to achieve the above purposes, an aspect of the present disclosure provides a binder for a lithium secondary battery, the binder containing a polyimide copolymer containing a repeating unit represented by a following Chemical Formula 1 and a repeating unit represented by a following Chemical Formula 2:

[Chemical Formula 1]

[Chemical Formula 2]

(In the Chemical Formula 1 and the Chemical Formula 2, each of $R_1$ to $R_6$ independently represents one functional group selected from a group consisting of H, —$CH_{3-x}F_x$ and —F, $R_7$ represents at least one functional group selected from a group consisting of a carboxyl group, a hydroxy group, a sulfonic acid group, a phosphoric acid group, and an acid anhydride group, x denotes an integer from 1 to 3, and each of a and b independently denotes an integer of 2 to 200.

In the binder for the lithium secondary battery according to one embodiment of the present disclosure, the polyimide copolymer contains the repeating unit represented by the Chemical Formula 1 and the repeating unit represented by the Chemical Formula 2 at a molar ratio (a/b) in a range of from 1 to 10.

In the binder for the lithium secondary battery according to one embodiment of the present disclosure, the polyimide copolymer may contain a repeating unit represented by a following Chemical Formula 3 and a repeating unit represented by a following Chemical Formula 4.

[Chemical Formula 3]

[Chemical Formula 4]

(In the Chemical Formulas 3 and 4, each of a and b independently denotes an integer of from 2 to 200).

In the binder for the lithium secondary battery according to one embodiment of the present disclosure, the polyimide copolymer may have a weight average molecular weight of from 10,000 to 200,000 g/mol.

Further, another aspect of the present disclosure relates to a positive electrode for a lithium secondary battery, the positive electrode containing the binder for the lithium secondary battery, a positive electrode active material, and a conductive material In the positive electrode for the lithium secondary battery according to one embodiment of the present disclosure, the binder may be contained in an amount of 1 to 50% by weight based on a total weight of the binder, the active material, and the conductive material.

In the positive electrode for the lithium secondary battery according to one embodiment of the present disclosure, the positive electrode active material includes at least one selected from a group consisting of $LiCoO_2$, $xLi_2MnO_3 \cdot (1-x)LiMn_{1-y-z}Ni_yCo_zO_2$ (0.05≤x≤0.95, 0.01≤y≤0.98, 0.01≤z≤0.98), $Li_aNi_{1-x-y}Co_xMn_yM_bO_2$ (0.98≤a≤1.1, 0≤x≤0.5, 0.05≤y≤0.5, 0≤b≤0.1, M' represents a transition metal or lanthanide element selected from Al, Cr, Fe, Mg, Ti, V, Cu, Zn, Ca, La, Ce, Sr, Sn, Si and combinations thereof), $LiNi_{0.8}Co_{0.15}Al_{0.05}O_2$, $Li_aMn_{2-x}M_xN_bO_4$ (0.98≤a≤1.1, 0≤x≤1, 0≤b≤0.1, M represents one selected from Ni, Co, Cr, Fe, V, Cu, Zn, and combinations thereof, N represents one selected from Ni, Co, Cr, Fe, V, Cu, Zn, Mg, Ca, La, Ce, Sr, Sn, Si and combinations thereof), and $LiMPO_4$ (M represents one selected from Ni, Co, Cr, Fe, V, Cu, Zn, and combinations thereof).

In the positive electrode for the lithium secondary battery according to one embodiment of the present disclosure, the positive electrode active material has a coating on a surface thereon, the coating including an oxide, a fluoride, a phosphide, or a sulfide of at least one selected from a group consisting of Al, Zr, Sn, Si, Zn, Nb, Ni and Co.

Further, another aspect of the present disclosure relates to a lithium ion secondary battery having the positive electrode for the lithium secondary battery.

The lithium secondary battery according to one embodiment of the present disclosure may have a charge cut-off voltage of from 4.1V to 6.0V.

The lithium secondary battery according to one embodiment of the present disclosure may have an operating temperature of from −60° C. to 100° C.

The lithium secondary battery according to one embodiment of the present disclosure includes a negative electrode containing at least one negative electrode active material selected from a group consisting of lithium metal, lithium alloy, coke, artificial graphite, natural graphite, soft carbon, hard carbon, organic polymer compound combustion material, carbon fiber, silicon, tin, germanium, graphite containing silicon, tin or germanium, $Li_4Ti_5O_{12}$, and $TiO_2$.

Technical Effects

The binder for the lithium secondary battery according to the present disclosure may have excellent thermal stability as well as improved interfacial adhesion to the active material, and may secure electrode structure stability even at high voltage, thereby improving durability.

Further, the lithium secondary battery including the electrode containing the binder according to the present disclosure may have battery characteristics of high capacity and high rate, and may have excellent capacity retention characteristics, cycle characteristics, and improved life characteristics at a repeated charging and discharging test under a high voltage condition.

DETAILED DESCRIPTIONS

Hereinafter, a binder for a lithium secondary battery according to the present disclosure, an electrode containing the same, and a lithium secondary battery including the electrode will be described in detail. The present disclosure may be better understood based on following embodiments. The following embodiments are set forth for illustrative purposes of the present disclosure, and are not intended to limit a protection scope defined by the appended claims. In this connection, technical terminology and scientific terminology as used herein have meanings that are commonly understood by those of ordinary skill in the art to which the disclosure belongs, unless otherwise defined.

The present inventors have deepened research on a lithium secondary battery with high energy density and, more specifically, a binder for an electrode of the lithium secondary battery, to improve stability and performance of the lithium secondary battery. Thus, we have identified that providing the binder containing a polyimide having a combination of specific functional groups including a fluorine functional group as a component of an electrode composition may allow improvement of durability via adhesion thereof to an active material, and at the same time, the binder forms a surface protective layer on a positive electrode surface, and thus the protective layer performs multifunctional roles, thereby ensuring electrode stability, particularly thermal stability and high voltage stability, thereby significantly increasing the capacity of the positive electrode, and realizing excellent capacity retention characteristics, cycle characteristics, and lifetime characteristics. In this way, the present disclosure has been completed.

According to an aspect of the present disclosure, the binder for the lithium secondary battery is characterized by containing a polyimide copolymer having an acid group and a fluorine group at the same time. Specifically, the polyimide copolymer according to the present disclosure contains a repeating unit represented by a following Chemical Formula 1 and a repeating unit represented by a following Chemical Formula 2.

[Chemical Formula 1]

[Chemical Formula 2]

In the repeating unit compound according to the Chemical Formula 1 and the Chemical Formula 2, each of $R_1$ to $R_6$ independently represents hydrogen, fluorine or fluoroalkyl having 1 to 3 carbon atoms. Specifically, each of $R_1$ to $R_6$ independently may represent one functional group selected from —H, —$CH_{3-x}F_x$ and —F, specifically, a fluorine group. In this connection, x is an integer from 1 to 3.

Further, $R_7$ may be at least one acid group selected from a group consisting of a carboxyl group, a hydroxyl group, a sulfonic acid group, a phosphoric acid group, and an acid anhydride group. However, the present disclosure is not limited thereto. Specifically, $R_7$ may be a carboxyl group or a hydroxy group.

Further, each of a and b independently denotes an integer of from 2 to 200, specifically, from 10 to 100, and more specifically, from 30 to 80. The above range may be advantageous in the formation of the surface protective layer on the surface of the electrode active material. The above range may minimize performance degradation even at a repeated charge and discharge test and may ensure safety. However, the above range is only a non-limiting example. The present disclosure is not limited to the numerical range.

The polyimide copolymer refers to a polymer containing the repeating unit represented by the Chemical Formula 1 and the repeating unit represented by the Chemical Formula 2. In this connection, although a form of the copolymer is not particularly limited, the copolymer may be at least one copolymer selected from an alternating copolymer, a random copolymer, a block copolymer, and a graft copolymer.

According to an aspect of the present disclosure, the binder for the lithium secondary battery containing the polyimide copolymer may not only increase the adhesion between the conductive material and the electrode active material, but also prevent removal of an electrode containing the binder from an electrode current collector. In particular, the binder performs multi-functional roles to form the surface protective layer on the surface of the electrode active material, thereby to secure electrode stability, particularly thermal stability and high voltage stability. This may be more effective in improving the stability of the electrode structure and battery characteristics, specifically, high rate, high capacity, cycle characteristics and life characteristics.

Furthermore, a molar ratio (a/b) between the repeating unit represented by the Chemical Formula 1 and the repeating unit represented by the Chemical Formula 2 contained in the polyimide copolymer may be controlled to effectively secure the battery characteristics including high rate, high capacity and cycle life characteristics, as well as thermal stability and high voltage stability. Specifically, the polyimide copolymer may contain the repeating unit represented by the Chemical Formula 1 and the repeating unit represented by the Chemical Formula 2 at a molar ratio (a/b) of from 1 to 10, more specifically, from 2 to 7. More specifically, in the polyimide copolymer, the molar ratio between the repeating unit represented by the Chemical Formula 1 and the repeating unit represented by the Chemical Formula 2 may be in a range of from 3:1 to 5:1. The above range may be more effective in securing the stability of the electrode structure and improving battery performance and in achieving the above effects.

A weight average molecular weight of the polyimide copolymer is not particularly limited, but may be 10,000 to 186,000 g/mol, and more specifically, 25,000 to 65,000 g/mol. The above range may be effective in terms of improving the adhesion between the active material and the conductive material, and of securing the stability of the electrode structure. This is only a non-limiting example. The present disclosure is not limited to the numerical range. In this connection, a sample is dissolved in tetrahydrofuran (THF) and then the weight average molecular weight is measured using gel permeation chromatography (GPC) (analysis column: Styragel HR from WATERS company, standard substance: polystyrene (PS)).

According to an aspect of the present disclosure, the polyimide copolymer may contain a repeating unit represented by a following Chemical Formula 3 and a repeating unit represented by a following Chemical Formula 4.

[Chemical Formula 3]

[Chemical Formula 4]

In the Chemical Formulas 3 and 4, each of a and b independently denotes an integer of from 2 to 200.

According to one aspect of the present disclosure, the binder for the lithium secondary battery containing the polyimide copolymer is more effectively applied to the positive electrode. Usually, in terms of the structural stability of the electrode, the characteristic change according to the combination of the conductive material and the active material is large, and the binder contained in an electrode slurry plays an important role in terms of the adhesion to the active material or the conductive material, and the uniformity or dispersibility of the electrode slurry containing the active material and the conductive material. Thus, the binder may be used for the positive electrode for the lithium secondary battery in order to prevent decrease in the capacity due to the elution of lithium or prevent deterioration of the cycle characteristics. However, the present disclosure is not necessarily limited thereto.

Figure 1:
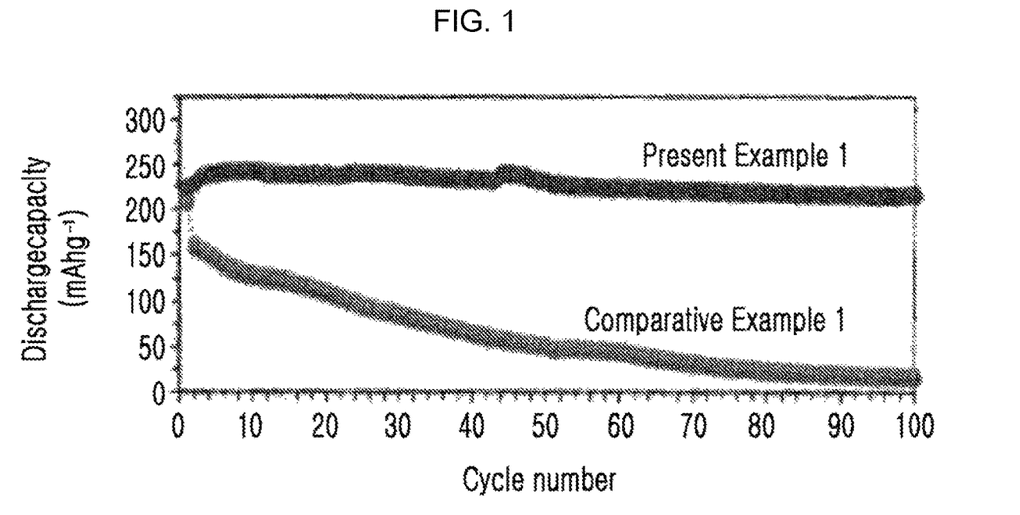
FIG. 1 to FIG. 3 show cycle characteristics of lithium secondary batteries according to Present Example 1 and Comparative Example 1.
Figure 6:
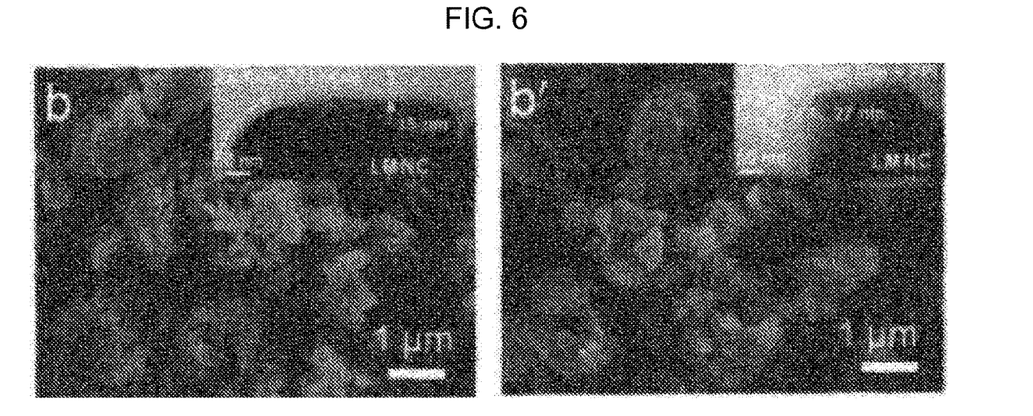
FIG. 6 shows morphological change (b→b') of electrode active material particles according to Present Example 1.
Figure 7:
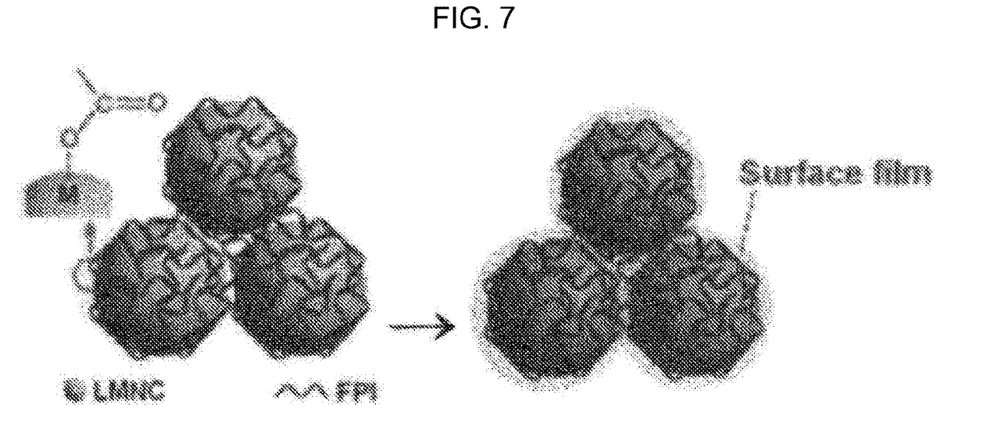
FIG. 7 schematically shows particle change according to Present Example 1.

According to an aspect of the present disclosure, the binder may contain a carboxyl group and thus may have a binding property via coordination with respect to a positive electrode material of a transition metal oxide component and has an effect of providing excellent adhesion with the active material. Furthermore, controlling a content of the carboxyl group may allow controlling the binding property thereof to a surface of the positive electrode of the transition metal oxide. In a non-limiting example, the —$CF_3$ group may increase a polarity of the binder and thus serve to increase solubility of the binder, thereby achieve an effect of forming a uniform surface layer on the positive electrode surface (upper right of b of FIG. 6). Further, when compared with a conventional commercially available PVdF, the binder according to the present disclosure may greatly improve the electrochemical oxidation stability and thermal stability. As shown in FIG. 1, the binder may form a uniform protective layer on the positive electrode surface, thereby to prevent elution of the positive electrode metal, and the electrochemical oxidation reaction of the electrolyte at an interface which occurs at a charge cut-off voltage of 4.2V or higher. Therefore, a separate electrolyte additive is not used in order to improve the oxidation stability of the electrolyte.

Another aspect of the present disclosure provides a positive electrode for a lithium secondary battery, the electrode containing the binder for the lithium secondary battery as defined above, the positive electrode active material, and the conductive material.

The binder includes the binder material for the lithium secondary battery as described above. The binder material may be used in combination with materials known as a binder material other than the binder material in a range that does not deviate from a desired effect of the present disclosure.

The known material may include at least one selected from a group consisting of polyvinylidene difluoride (PVdF), hexafluoro propylene (HFP), polyvinylidene fluoride-co-hexafluoro propylene, polyvinylidene fluorideco-trichloroethylene, sodium polyacrylate, sodium alginate, polymethylmethacrylate, polybutylacrylate, polyacrylonitrile, polyvinylpyrrolidone, polyvinylacetate, polyethylene oxide, polyarylate, cellulose acetate, cellulose acetate butyrate, cellulose acetate propionate, cyanoethylpullulan, cyanoethylpolyvinylalcohol, cyanoethylcellulose, pullulan, cyanoethylsucrose, carboxylic methyl cellulose (CMC), polyimide, polyamide, polyamideimide, styrene-butadiene rubber (SBR), styrene-ethylene-butylene-styrene (SEBS), polyvinyl alcohol (PVA), and ethylene-vinyl acetate copolymer (EVA). However, the present disclosure is not limited thereto.

A content of the binder is not limited particularly. Specifically, the content of the binder may be in a range of from 1 to 50% by weight, specifically, from 2 to 20% by weight, more specifically, from 5 to 15% by weight based on a total weight of the binder, the active material and the conductive material. The above range may be effective in achieving the desired effect according to the present disclosure. However, this is only a non-limiting example. The present disclosure is not limited to the above range. In particular, the binder material according to an aspect of the present disclosure has advantageous properties in that the binder material may be contained in a small amount compared to that of the conventionally used binder in order to achieve the target effect thereof.

The binder may be used without limitation as long as it is dissolved in a common organic solvent used in the art. Specific examples of the organic solvent may include, but may not be limited to, N-methyl pyrollidinon (NMP), tetrahydrofuran (THF), dimethyl sulfoxide (DMSO), dimethylformamide (DMF), and the like.

According to an aspect of the present disclosure, the positive electrode active material may be used without limitation, as long as it is conventional in the art. In a specific example, the positive electrode active material may include lithium cobalt complex oxide ($LiCoO_2$), spinel crystalline lithium manganese composite oxide ($LiMn_2O_4$), lithium manganese composite oxide (LiMnO$_2$), lithium nickel complex oxide (LiNiO$_2$), lithium iron phosphate (LiFePO$_4$), lithium manganese phosphate (LiMnPO$_4$), lithium cobalt phosphate (LiCoPO$_4$), lithium iron pyrophosphate (Li$_2$FeP$_2$O$_7$), lithium niobium composite oxide (LiNbO$_2$), lithium iron composite oxide (LiFeO$_2$), lithium magnesium composite oxide (LiMgO$_2$), lithium calcium composite oxide (LiCaO$_2$), lithium copper composite oxide (LiCuO$_2$), lithium zinc complex oxide (LiZnO$_2$), lithium molybdenum composite oxide (LiMoO$_2$), lithium tantalum composite oxide (LiTaO$_2$), lithium tungsten composite oxide (LiWO$_2$), lithium permanganate-nickel-cobalt composite oxide (xLi$_2$MnO$_3$(1-x)LiMn$_{1-y-z}$Ni$_y$Co$_z$O$_2$), lithium-nickel-cobalt-aluminum composite oxide (LiNi$_{0.8}$Co$_{0.15}$Al$_{0.50}$O$_2$), lithium-nickel-cobalt-manganese composite oxide (LiNi$_{0.33}$Co$_{0.33}$Mn$_{0.33}$O$_2$, LiNi$_{0.4}$Co$_{0.2}$Mn$_{0.4}$O$_2$, LiNi$_{0.5}$Co$_{0.2}$Mn$_{0.3}$O$_2$, LiNi$_{0.6}$Co$_{0.2}$Mn$_{0.2}$O$_2$, LiNi$_{0.7}$Co$_{0.15}$Mn$_{0.15}$O$_2$, LiNi$_{0.8}$Co$_{0.1}$Mn$_{0.1}$O$_2$, LiNi$_{0.85}$Co$_{0.075}$Mn$_{0.075}$O$_2$, LiNi$_{0.9}$Co$_{0.05}$Mn$_{0.05}$O$_2$), oxide-manganese-nickel (LiNi$_{0.5}$Mn$_{1.5}$O$_4$), sulfur (S), and the like, but may not be limited thereto.

More specifically, the positive electrode active material may include at least one selected from a group consisting of LiCoO$_2$, xLi$_2$MnO$_3$·(1-x)LiMn$_{1-y-z}$Ni$_y$Co$_z$O$_2$ (0.05≤x≤0.95, 0.01≤y≤0.98, 0.01≤z≤0.98), Li$_a$Ni$_{1-x-y}$Co$_x$Mn$_y$M$_b$O$_2$ (0.98≤a≤1.1, 0≤x≤0.5, 0.05≤y≤0.5, 0≤b≤0.1, M represents a transition metal or lanthanide element selected from Al, Cr, Fe, Mg, Ti, V, Cu, Zn, Ca, La, Ce, Sr, Sn, Si and combinations thereof), LiNi$_{0.8}$Co$_{0.15}$Al$_{0.05}$O$_2$, Li$_a$Mn$_{2-x}$M$_x$N$_b$O$_4$ (0.98≤a≤1.1, 0≤x≤1, 0≤b≤0.1, M represents one selected from Ni, Co, Cr, Fe, V, Cu, Zn, and combinations thereof, N represents one selected from Ni, Co, Cr, Fe, V, Cu, Zn, Mg, Ca, La, Ce, Sr, Sn, Si and combinations thereof), and LiMPO$_4$ (M represents one selected from Ni, Co, Cr, Fe, V, Cu, Zn, and combinations thereof). When the positive electrode active material is used, excellent capacity retention characteristics and cycle life characteristics are improved at the repeated charging and discharging test at a high voltage charge cut-off voltage of 4.1 V or greater and electrode structure stability even at a high temperature and high voltage is secured due to the combination of the above-mentioned polyimide copolymer.

A content of the electrode active material is not particularly limited. However, specifically, the content thereof may be in a range of from 2 to 85% by weight, specifically, from 3 to 75% by weight, more specifically, from 5 to 60% by weight, relative to the total weight of the binder, the active material and the conductive material. The above range may be effective in achieving the desired effect in accordance with the present disclosure, but this is only a non-limiting example and the present disclosure not limited to the above range.

The conductive material is not particularly limited as long as it has conductivity, but specifically, carbon powder may be used as the conductive material. For example, the conductive material may include at least one selected from a group consisting of carbon black, super-P carbon black, acetylene black, ketjen black, graphite, carbon fiber, carbon tube, carbon nanofiber, carbon nanotubes, carbon nanowires and graphene. However, the present disclosure is not limited thereto.

A content of the conductive material is not limited particularly, but specifically, the content thereof may be in a range of from 1 to 50% by weight, specifically, from 5 to 40% by weight, more specifically, from 10 to 30% by weight with respect to the total weight of the binder, the active material and the conductive material. The above range may be effective in achieving the desired effect in accordance with the present disclosure, but this is only a non-limiting example and the present disclosure not limited to the above range.1

According to an aspect of the present disclosure, the positive electrode may be prepared by mixing the binder, the positive electrode active material and the conductive material in a solvent to prepare a slurry as an electrode-forming composition, and applying the slurry onto a current collector. In this connection, the slurry composition refers to a combination of the components including the binder and may be used to prepare the positive electrode having an appropriate porosity and a high loading level, thereby improving wettability with the electrolyte to improve diffusion of lithium ions, and, furthermore, to increase the charge/discharge performance and thus to achieve excellent cycle life characteristics.

A material of the current collector may be used without particular limitation as long as it has electrical conductivity, and is capable of being electrically connected to the positive electrode material. For example, a material of the current collector may include at least one selected from a group consisting of C, Ti, Cr, Mo, Ru, Rh, Ta, W, Os, Ir, Pt, Au and Al. Specifically, examples of the material of the current collector include C, Al, and stainless steel. More specifically, Al is preferable as the material thereof in terms of cost and efficiency. A shape of the current collector is not particularly limited. A thin film substrate or a three-dimensional substrate such as foamed metal, mesh, woven fabric, nonwoven fabric, foam, etc. may be used as the collector. This is effective in high rate and charge/discharge characteristics because the slurry is sufficiently adhered to the current collector, so that the electrode with a high capacity density may be obtained even when the content of the binder is low.

Another aspect of the present disclosure is to provide a lithium secondary battery having the positive electrode for the lithium secondary battery as described above.

A mixture containing a negative electrode active material, the conductive material and a binder may be applied and dried on a negative electrode current collector. Then, a separator, the positive electrode, the negative electrode, and an electrolyte containing a lithium salt may be combined with each other to prepare the lithium secondary battery.

The negative electrode active material may be used without limitation as long as it is a common one used in this technical field. In a specific example, lithium metal or lithium alloy, coke, artificial graphite, natural graphite, soft carbon, hard carbon, organic polymer compound combustion material, carbon fiber, silicon, tin, germanium, graphite containing silicon, tin germanium, Li$_4$Ti$_5$O$_{12}$, TiO$_2$ and the like may be used alone or in combination each other as the negative electrode active material. However, the present disclosure is not necessarily limited thereto.

In this connection, the separator may be interposed between the positive electrode and the negative electrode. An insulating thin film having high ion permeability and mechanical strength may be used as the separator. Further, a pore diameter of the separator may be generally 0.01 to 10 μm, and a thickness thereof may generally be 5 to 300 μm. However, the present disclosure is not limited thereto. Examples of the material of the separator may include olefin-based polymers such as polypropylene and polyethylene, or glass fibers, sheets, and non-woven fabrics. However, the present disclosure is not limited thereto.

The lithium salt-containing electrolyte may contain an electrolyte salt including at least one selected from a group consisting of lithium hexafluorophosphate, lithium perchlorate, lithium tetrafluoroborate, lithium trifluoromethanesulfonic acid, and lithium imide trifluoromethanesulfonic acid. However, the present is not limited thereto. Examples of a solvent of the electrolyte may include propylene carbonate, ethylene carbonate, dimethyl carbonate, diethyl carbonate, ethylmethyl carbonate, and γ-butyrolactone (γ-butyrolactone), and the like. However, the present is not necessarily limited thereto.

The lithium secondary battery according to an aspect of the present disclosure has excellent thermal characteristics, stability at high voltage, and cycle life characteristics, and may achieve high capacity characteristics.

Specifically, the present disclosure may provide a lithium secondary battery for high capacity and high voltage, wherein the lithium secondary battery has a charge cut off voltage of from 4.1V to 6.0V, specifically, from 4.3V to 5.5V, more specifically, from 4.4 to 5.0V. Within the above range, stability may be secured even at high temperature and high voltage, and bout of high capacity characteristics and cycle life characteristics may be secured.

Further, the lithium secondary battery may have an operating temperature of from −60° C. to 100° C., specifically, from −30° C. to 70° C. Due to the structural stability even at extremely low or high temperatures as in the above range, the battery has excellent battery characteristics including charge/discharge performance without cracking or damage during operation.

The lithium secondary battery requires high capacity, high power and high safety, and thus may be a lithium ion battery, a lithium metal battery, a lithium polymer battery, a lithium ion polymer battery or a lithium sulfur battery. However, the present disclosure is not limited thereto. Further, the lithium secondary battery may be used as a unit cell in a medium-to-large-sized battery module including a plurality of battery cells used as a power source for a small device or a medium-sized device. Examples of such devices may include a mobile device, a wearable device, and a power tool driven by an electrical motor; an electric vehicle including an electric vehicle (EV), a hybrid electric vehicle (HEV), a plug-in hybrid electric vehicle (PHEV), and the like; electric two-wheeled vehicle including an electrical bike (E-bike) and an electrical scooter (E-scooter); electric golf carts; an energy storage system), and the like. However, the present disclosure is not limited thereto.

Hereinafter, the positive electrode for the secondary battery according to the present disclosure and the lithium secondary battery including the same will be described in more detail based on following examples. However, the following examples act as only a reference for explaining the present disclosure in detail, and the present disclosure is not limited thereto. The present disclosure may be implemented in several forms.

Further, unless defined otherwise, all technical and scientific terms have meanings corresponding to those generally understood by one of those skilled in the art to which the present disclosure belongs. The terms used in the description herein are merely intended to effectively describe specific embodiments and are not intended to limit the present disclosure.

Further, a singular form used in the specification and the appended claims may be intended to include a plural form unless specifically indicated in a context.

Preparation Example 1

Figure 8:
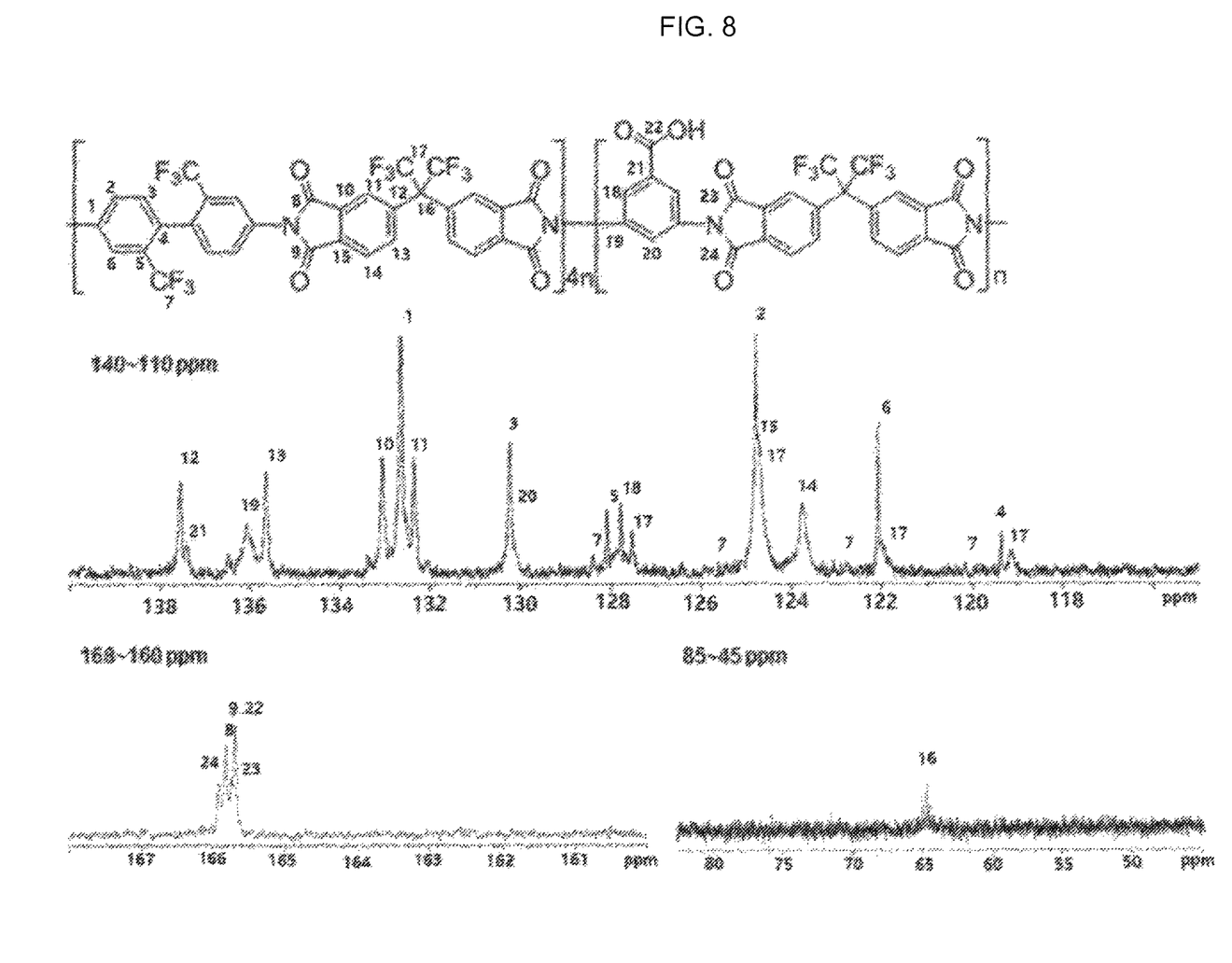
FIG. 8 shows a result of NMR analysis of a polyimide copolymer prepared in Preparation Example 1.

6-FDA (4,4'-(hexafluoroisopropylidene)diphthalic anhydride)/TFDB (2 2'-bis (trifluoromethyl)-4 4'-diaminobiphenyl)/DABA (3,5-diaminobenzoic acid) monomers were combined with each other in a 5:4:1 molar ratio to prepare a polyimide copolymer. TFDB (19.1 g, 59.6 mmol, Aldrich) and 6-FDA (33.1 g, 74.5 mmol, Aldrich) were dissolved in 90 ml of DMF (N,N'-dimethylformamide) to obtain a first solution. DABA (2.30 g, 14.9 mmol, Aldrich) was dissolved in 50 ml of DMF to obtain a second solution. Then, the two solutions were placed in a round flask under a nitrogen atmosphere and were mixed with each other at 0° C. for 5 hours. A temperature was raised to room temperature (25° C.) and the mixture was stirred for 17 hours. Then, 40 ml of acetic anhydride and 29 ml of pyridine were added thereto and the mixture was stirred to prepare a polyamic acid solution which in turn was stirred at 80° C. for 24 hours. Thereafter, the mixture was cooled at room temperature and precipitated by dropping the cooled mixture into a beaker containing distilled water therein and was filtered and washed and then dried at 120° C., thereby to prepare a polyimide copolymer (a/b=4, weight average molecular weight=55,000 g/mol) containing a monomer represented by a following Chemical Formula 3 and a monomer represented by a following Chemical Formula 4. As shown in FIG. 8, it was confirmed based on a result of NMR analysis of the prepared polyimide copolymer that the polyimide copolymer containing the monomer represented by the following Chemical Formula 3 and a monomer represented by the following Chemical Formula 4 was produced.

[Chemical Formula 3]

[Chemical Formula 4]

Present Example 1

75% by weight of 0.3Li$_2$MnO$_3$0.7Li$_2$MnO$_{0.33}$Ni$_{0.33}$Co$_{0.33}$O$_2$ (diameter 3 μm) as the positive electrode active material, 10% by weight of a polyimide copolymer (a/b=4, weight average molecular weight=55,000 g/mol) containing the monomer represented by the Chemical Formula 3 and the monomer represented by the Chemical Formula 4 as the binder, and 15% by weight of carbon black (super-P) as the conductive material were added to methylpyrrolidone (NMP) and were uniformly mixed to prepare a slurry. The slurry was applied on an aluminum foil as a current collector and was subjected to drying and rolling at 110° C. for 12 hours. Thus, a positive electrode for a secondary battery having a thickness of 35 μm was prepared.

Further, a graphite negative electrode was used as a counter electrode. LiPF$_6$/EC:EMC in which 1 M of LiPF$_6$ was dissolved in a mixed solvent in which ethylene carbonate (EC) and ethyl methyl carbonate (EMC) were mixed with each other at a volume ratio of 3:7 was used as the electrolyte. Any electrolyte additives were not used. Thus, a coin lithium full cell was produced.

Comparative Example 1

A coin lithium full cell was produced as in the same manner as Present Example 1, except that instead of the binder used in Present Example 1, commercialized PVdF (Kynar™ 761, Arkema company) was used.

Cycle characteristics of the lithium full cells prepared in Present Example 1 and Comparative Example 1 were evaluated. Specifically, the prepared lithium cells were charged and discharged 100 times at a condition of 0.2 C/0.2 C within a driving voltage range of 2.5 to 4.7 V at 55° C. to measure the cycle characteristics. the results are shown in FIG. 1 to FIG. 3.

Figure 2:
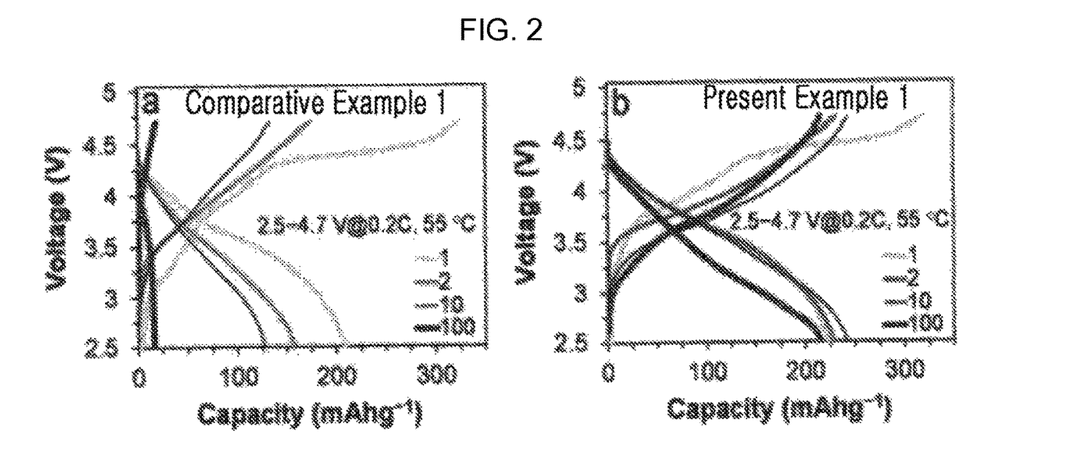
Figure 3:
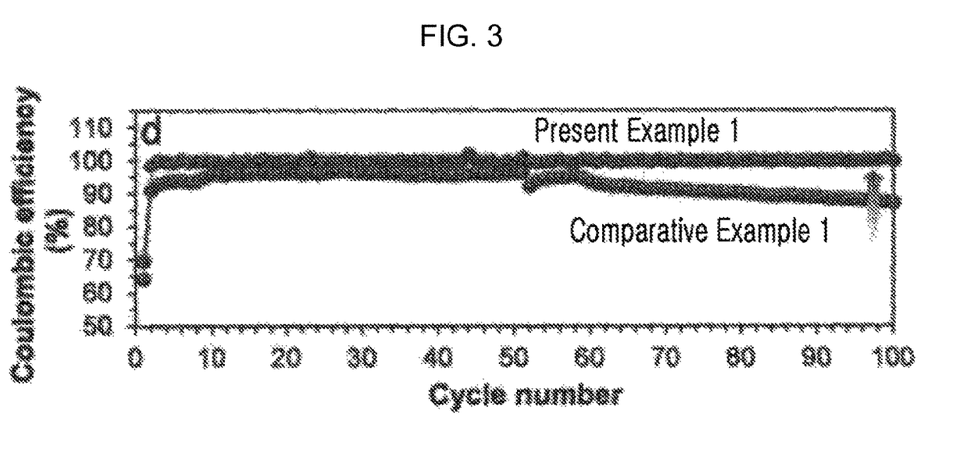
Figure 4:
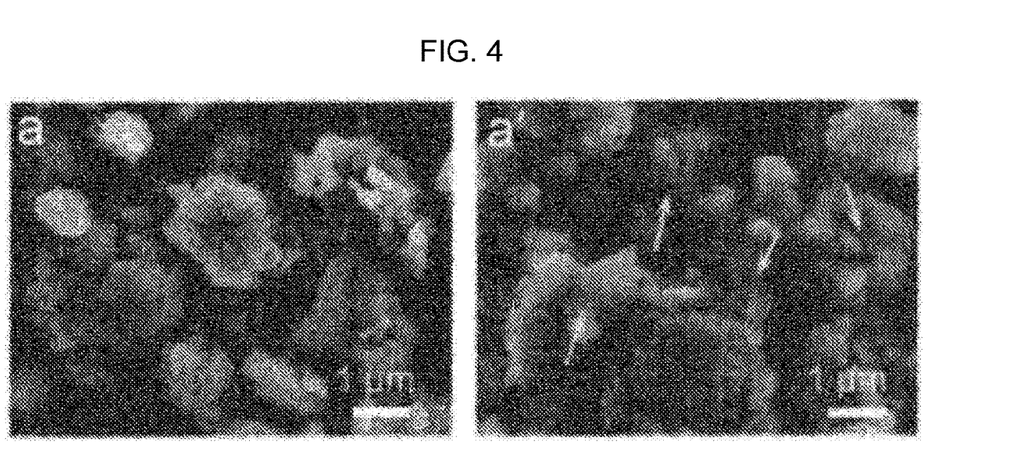
FIG. 4 shows morphological change (a→a') of electrode active material particles according to Comparative Example 1.
Figure 5:
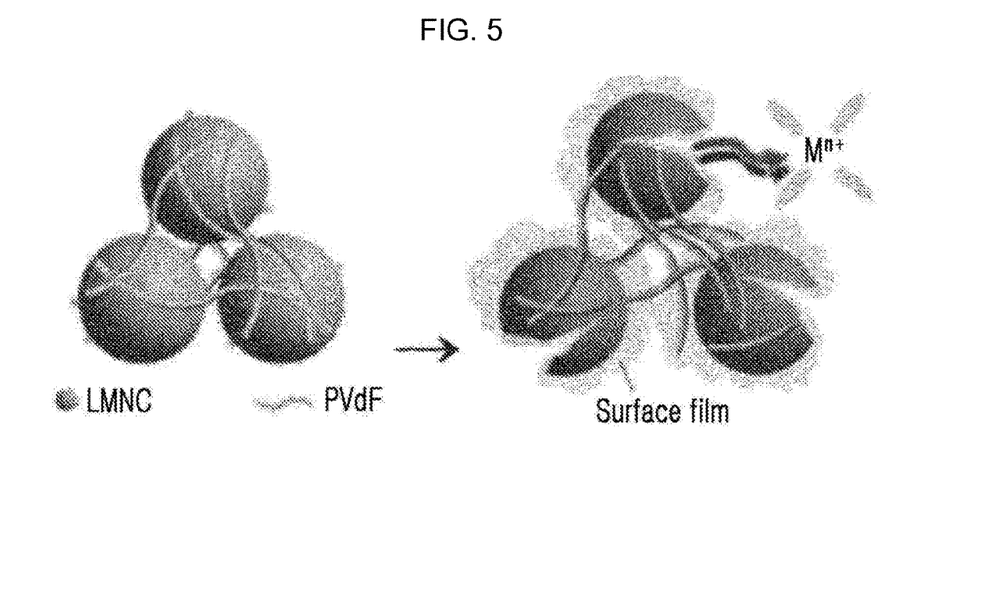
FIG. 5 schematically shows particle change according to Comparative Example 1.

As shown in FIG. 1 to FIG. 3, it was confirmed that at the high temperature and high voltage charging voltage conditions, in Present Example 1 using the polyimide copolymer according to the present disclosure as the binder, a capacity value of the positive electrode was about 250 mAh/g and a capacity retention percentage thereof was 89% at 100 cycles and thus the charge/discharge cycle performance was greatly improved, compared to Comparative Example 1 using the commercial PVdF as the binder. Further, changes in the active material particles as shown in FIG. 4 to FIG. 7 were identified.

Present Example 2

75% by weight of containing $LiNi_{0.8}Mn_{0.1}Co_{0.1}O_2$ (diameter 13 μm) as a positive electrode active material, 10% by weight of a polyimide copolymer (a/b=4, weight average molecular weight=55,000 g/mol) containing the monomer represented by the Chemical Formula 3 and the monomer represented by the Chemical Formula 4 as the binder, and 15% by weight of carbon black (super-P) as the conductive material were added to methylpyrrolidone (NMP) and were uniformly mixed with each other to prepare a slurry. The prepared slurry was applied on an aluminum foil as a current collector, and was dried and rolled at 110° C. for 12 hours to prepare a positive electrode for a secondary battery having a thickness of 35 μm.

Further, a lithium metal (Li) negative electrode was used as a counter electrode. $LiPF_6$/EC:EMC in which 1 M of $LiPF_6$ was dissolved in a mixed solvent in which ethylene carbonate (EC) and ethyl methyl carbonate (EMC) were mixed with each other at a volume ratio of 3:7 was used as the electrolyte. Any electrolyte additives were not used. Thus, a coin lithium full cell was produced.

Comparative Example 2

A coin lithium full cell was produced as in the same manner as Present Example 2, except that instead of the binder used in Present Example 1, commercialized PVdF (Kynar™ 761, Arkema company) was used.

Cycle characteristics of the lithium full cells prepared in Present Example 2 and Comparative Example 2 were evaluated. Specifically, the prepared lithium cells were charged and discharged 100 times at a condition of 0.2 C/0.2 C within a driving voltage range of 2.5 to 4.7 V at room temperature to measure the cycle characteristics. the results are shown in FIG. 9.

Figure 9:
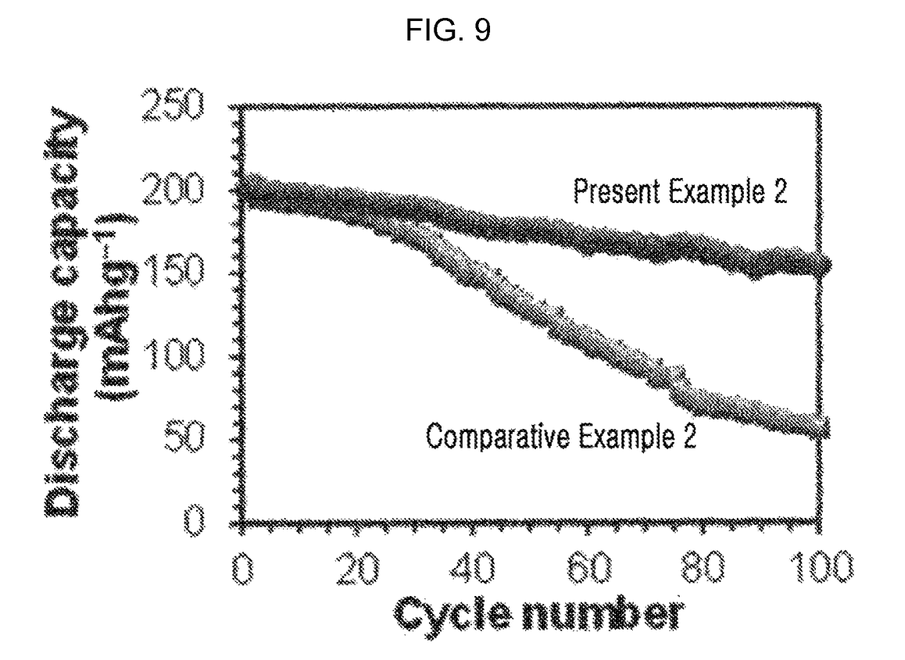
FIG. 9 shows cycle characteristics of lithium secondary batteries according to Present Example 2 and Comparative Example 2.

As shown in FIG. 9, it was confirmed that even at a condition of 4.4V high voltage charging voltage, in Present Example 2 using the polyimide copolymer according to the present disclosure as the binder, a capacity value of the pernickel oxide positive electrode was about 203 mAh/g and a capacity retention percentage thereof was 79% at 100 cycles and thus the charge/discharge cycle performance was greatly improved, compared to Comparative Example 2 using the commercial PVdF as the binder.

As described above, the present disclosure has been described based on the limited embodiments, which are provided only to help a more comprehensive understanding of the present disclosure, and the present disclosure is not limited to the above embodiments. Those skilled in the art to which the present disclosure belongs may make various modifications and variations from these descriptions.

Accordingly, spirit of the present disclosure should not be limited to the described embodiments. It will be said that not only the claims to be described later, but also any equivalent or equivalent modifications to the claims fall within the scope of the present disclosure.

What is claimed is:

1. A binder for a lithium secondary battery, the binder containing a polyimide copolymer containing a repeating unit represented by a following Chemical Formula 1 and a repeating unit represented by a following Chemical Formula 2:

wherein in the Chemical Formula 1 and the Chemical Formula 2, each of $R_1$ to $R_6$ independently represents one functional group selected from a group consisting of H, $-CH_{3-x}F_x$ and $-F$, $R_7$ represents at least one functional group selected from a group consisting of a carboxyl group, a hydroxy group, a sulfonic acid group, a phosphoric acid group, and an acid anhydride group, x denotes an integer from 1 to 3, and each of a and b independently denotes an integer of 2 to 200.

2. The binder of claim 1, wherein the polyimide copolymer contains the repeating unit represented by the Chemical Formula 1 and the repeating unit represented by the Chemical Formula 2 at a molar ratio (a/b) in a range of from 1 to 10.

3. The binder of claim 2, wherein the polyimide copolymer may contain a repeating unit represented by a following Chemical Formula 3 and a repeating unit represented by a following Chemical Formula 4:

wherein in the Chemical Formulas 3 and 4, each of a and b independently denotes an integer of from 2 to 200.

4. The binder of claim 1, wherein the polyimide copolymer has a weight average molecular weight of from 10,000 to 200,000 g/mol.

5. A positive electrode for a lithium secondary battery, the positive electrode containing the binder for the lithium secondary battery of claim 1, a positive electrode active material, and a conductive material.

6. The positive electrode of claim 5, wherein the binder is contained in an amount of 1 to 50% by weight based on a total weight of the binder, the active material, and the conductive material.

7. The positive electrode of claim 5, wherein the positive electrode active material includes at least one selected from a group consisting of $LiCoO_2$, $xLi_2MnO_3 \cdot (1-x)LiMn_{1-y-z}Ni_yCo_zO_2$ ($0.05 \leq x \leq 0.95$, $0.01 \leq y \leq 0.98$, $0.01 \leq z \leq 0.98$), $Li_aNi_{1-x-y}Co_xMn_yMbO_2$ ($0.98 \leq a \leq 1.1$, $0 \leq x \leq 0.5$, $0.05 \leq y \leq 0.5$, $0 \leq b \leq 0.1$, M represents a transition metal or lanthanide element selected from Al, Cr, Fe, Mg, Ti, V, Cu, Zn, Ca, La, Ce, Sr, Sn, Si and combinations thereof), $LiNi_{0.8}Co_{0.15}Al_{0.05}O_2$, $Li_aMn_{2-x}M_xN_bO_4$ ($0.98 \leq a \leq 1.1$, $0 \leq x \leq 1$, $0 \leq b \leq 0.1$, M represents one selected from Ni, Co, Cr, Fe, V, Cu, Zn, and combinations thereof, N represents one selected from Ni, Co, Cr, Fe, V, Cu, Zn, Mg, Ca, La, Ce, Sr, Sn, Si and combinations thereof), and $LiMPO_4$ (M represents one selected from Ni, Co, Cr, Fe, V, Cu, Zn, and combinations thereof).

8. A lithium ion secondary battery having the positive electrode for the lithium secondary battery of claim 5.

9. The lithium secondary battery of claim 8, wherein the lithium secondary battery has a charge cut-off voltage of from 4.1V to 6.0V.

10. The lithium secondary battery of claim 8, wherein the lithium secondary battery has an operating temperature of from −60° C. to 100° C.

11. The lithium secondary battery of claim 8, wherein the lithium secondary battery includes a negative electrode containing at least one negative electrode active material selected from a group consisting of lithium metal, lithium alloy, coke, artificial graphite, natural graphite, soft carbon, hard carbon, organic polymer compound combustion material, carbon fiber, silicon, tin, germanium, graphite containing silicon, tin or germanium, $Li_4Ti_5O_{12}$, and $TiO_2$.

* * * * *